May 2, 1950 J. G. VINCENT 2,506,399
CHANGE SPEED DRIVE MECHANISM
Filed Oct. 28, 1944 2 Sheets-Sheet 1

INVENTOR.
JESSE G. VINCENT
BY Tibbetts & Hart
ATTORNEYS

May 2, 1950 — J. G. VINCENT — 2,506,399
CHANGE SPEED DRIVE MECHANISM
Filed Oct. 28, 1944 — 2 Sheets-Sheet 2

INVENTOR.
JESSE G. VINCENT
BY
Sibbetts & Hart
ATTORNEYS

Patented May 2, 1950

2,506,399

UNITED STATES PATENT OFFICE 2,506,399

CHANGE-SPEED DRIVE MECHANISM

Jesse G. Vincent, Grosse Pointe Park, Mich., assignor to Packard Motor Car Company, Detroit, Mich., a corporation of Michigan Application October 28, 1944, Serial No. 560,795

4 Claims. (Cl. 74—766)

This invention relates to change speed drive mechanism.

An object of the invention is to provide drive mechanism in which three speeds are obtained through two planetary gearing units both connected with driving and driven shafts.

Another object of the invention is to provide a compact three speed balanced supercharger drive mechanism.

A further object of the invention is to improve the efficiency of an airplane engine by the provision of a supercharger drive mechanism having a plurality of gear ratios selectable as required by air pressure conditions.

Other objects of the invention will appear from the following description taken in connection with the drawings, which form a part of this specification, and in which.

Figure 1:
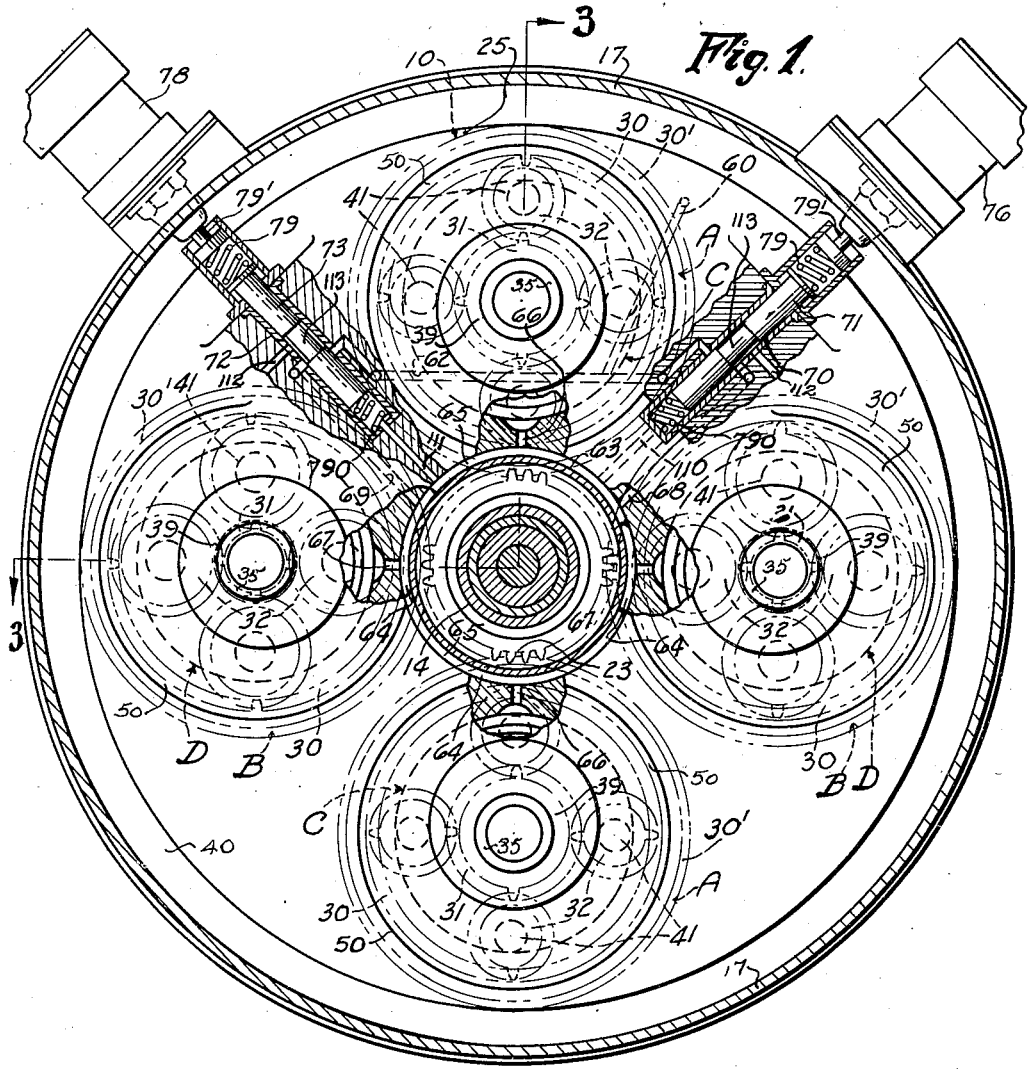
Fig. 1 is a view of a supercharger drive mechanism taken substantially on line 1—1 of Fig. 3.
Figure 2:
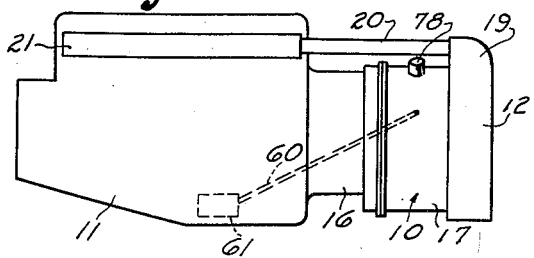
Fig. 2 is a diagrammatic view of a power unit incorporating the invention.

In the drawings, 10 indicates generally change speed mechanism that may be utilized as a drive for various purposes. In the illustrated embodiment, the mechanism is used as the drive between an internal combustion engine 11 and a supercharger device 12.

Figures 3, 4:
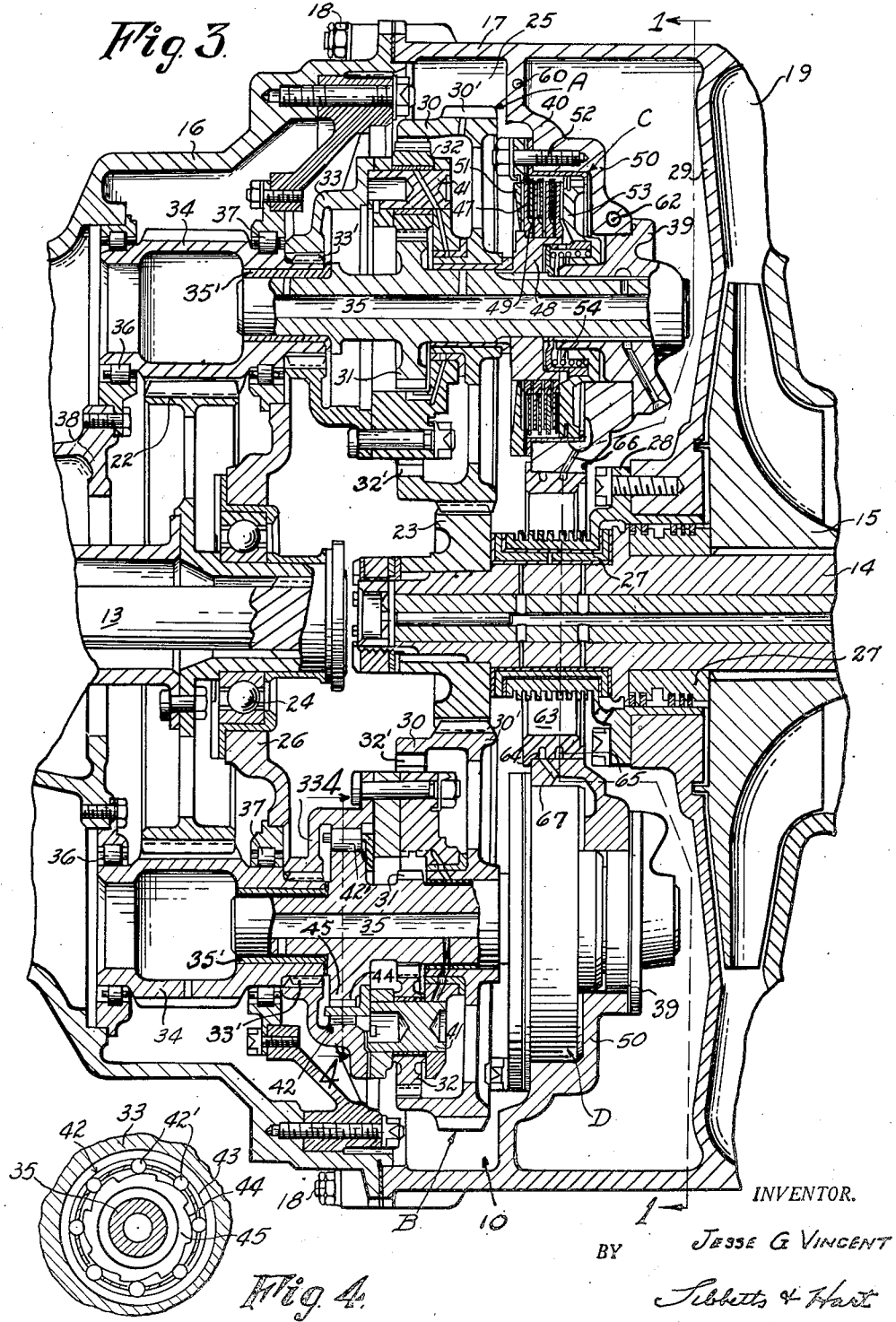
Fig. 3 is a sectional view of the drive mechanism taken on line 3—3 of Fig. 1.
Fig. 4 is a reduced sectional view taken on line 4—4 of Fig. 3 showing the overrunning clutch.

In Fig. 3, the drive shaft 13 is the engine crankshaft, or an extension thereof, and the driven shaft 14 has the supercharger impeller 15 fixed thereto. The change speed gearing is arranged between the drive and driven shafts and is housed in a chamber 25 formed by a section of engine casing 16 and a section of the supercharger casing 17, these casing sections being secured together by bolts 18. The outlet end 19 of the supercharger casing is connected with the engine intake manifold and fuel is supplied to the supercharger by conventional means (not shown).

Shafts 13 and 14 are arranged in axial alignment with their adjacent ends in chamber 25 and having gears 22 and 23 fixed thereto respectively. Drive gear 22 is supported by ball bearing 24 mounted in end wall 26 of the engine casing and the driven shaft is mounted in plain bearings 27 carried by a supporting ring member 28 fixed to wall 29 extending transversely in the supercharger casing.

The change speed gearing connecting the drive and driven shafts comprises planetary gearing sets A and B. Each gearing set preferably includes two units and the units of the sets are arranged alternately in a circle around the drive and driven gears in chamber 25 so that a unit of each set is mounted substantially opposite the other unit of the same set to provide balanced drives as will hereinafter appear. Each unit includes a ring gear 30 having internal teeth, a sun gear 31, and planetary gears 32 mounted on a carrier 33. The carriers are arranged to be driven from the drive shaft 13 by means of the gear 22, a gear 34, shown as a hollow gear, meshing with gear 22, and a splined connection 33' between said gear 34 and the carrier 33. The ring gear 30 is extended to form an external gear 30' which meshes with the gear 23 on the driven shaft 14. The hollow gears are carried by roller bearings 36 and 37, bearings 37 being mounted in wall 26 and bearings 36 being mounted in wall 38 of the engine casing section 16. Shafts 35 are carried by bearings 39 in wall 40 forming part of the casing 17 and by bearings 35' fixed in one end of gears 34. The planet gears are rotatably mounted on stub shafts 41 on the carriers.

As indicated above, the two planetary gearing units A are mounted opposite each other so that when those units are doing the driving the gears 30' and the gears 34 will be balanced on opposite sides of the axis of the driving and driven shafts. Also, having several units in each set permits of the use of smaller gears in the units as the drive is divided amongst the units. For purposes of description, however, a single A unit only may be referred to at times. The same thing is true of planetary gearing units B. These are opposite each other and when driving provide a balanced drive.

The planetary gearing units A and B differ from each other in two respects, first, in that the gear ratio is different. Thus it will be noted that the gear 31 of the unit A is larger than the gear 31 of the unit B, and in consequence thereof when the shaft 35 of unit A is held against rotation, as will hereinafter appear, the ring gear 30 will be rotated at a higher speed, and consequently the driven shaft 14 will be driven at a higher speed than is the case when unit B with its smaller planetary gear 31 is doing the driving. Second, the units A and B differ from each other in that in unit B there is a one-way clutch 42 between the carrier 33 and the sun gear shaft 35. The rollers 42' of this one-way clutch bear against the annular surface 43 on the carrier and against the inclined surfaces 44 on flanges 45 on the sun gear shaft. (See Fig. 4.) Thus, as pointed out above, the gear ratio in the sets is arranged so that unit A will increase the driving speed from shaft 13 to shaft 14 to a greater extent than the gearing in unit B. Thus unit A, when conditioned to drive, will provide high speed overdrive. Unit B will provide low and intermediate speed overdrive from shaft 13 to shaft 14, the low speed overdrive being automatically effective, when the sun gears in both units A and B are free, as the one-way clutch 42 couples the carrier 33 to the shaft 35 and causes the ring gear 30 to rotate at the same speed as the carrier and as the gear 34. Gears 34 will be driven approximately three times the speed of the crankshaft which will be the low speed drive for the ring gear 30. Then there is of course the second step-up of about one-to-two from ring gear 30 to driven shaft 14 through gears 30' and 23. When sun gear shaft 35 of unit B is held against rotation the carrier 33 will overrun shaft 35 and the planetary gears 32 will run around gear 31 and cause ring gear 30 to be rotated faster than carrier 33 but not as fast as in the case of unit A with its larger sun gear 31. Thus the intermediate speed of the ring gear 30 and consequently the driven shaft 14, is obtained.

In order to condition units A for driving, the sun gears of these planetary gearings are held stationary by brake mechanisms C, and similar brake mechanisms D are provided to hold the sun gear shafts in units B stationary when intermediate driving speed is desired. The brake mechanisms C or D are applied to select high or intermediate overdrive speed and when they are disengaged, low speed drive will be established through the one-way clutches 42 in units B.

Brake plates 47 are slidably splined to ring members 48 fixed to the sun gear shafts and plates 49 alternating with plates 47 are splined to annular housings 50 formed integral with casing wall 40. A backing member 51 is secured by bolts 52 to each housing and each housing contains a pressure ring or piston member 53. The pressure ring members are actuated to clamp or release the brake plates. Springs 54 in the housings act against the ring members to normally release the plates and conventional means can be utilized to move the ring members in a direction for engaging the plates.

When brake mechanisms C are made effective the sun gears in the planetary gearing units A are held stationary causing them to drive shaft 14 at the highest speed. When brake mechanisms C are engaged, brake mechanisms D will be released and the gearing units B will idle. When brake mechanisms D are engaged the sun gears in gearing units B will be held stationary and the drive will be at an intermediate speed. In intermediate speed relation, units A will idle and the one-way clutch rollers 42' will freewheel. When brake mechanisms C and D are released, the gearing units A and B will idle and the carriers and sun gears in units B will be locked up, or be wedged together by the one-way clutch 42 thus providing a direct drive through such gearing units from gears 34.

In order to obtain the best engine performance when the driven shaft is utilized to drive a supercharger impeller associated with an airplane engine, the drive through the gearing is selected to obtain the necessary air charges in the fuel mixture in accordance with atmospheric pressure. The brake mechanisms are preferably engaged by a hydraulic system.

The fluid under pressure is directed from pump 61 through passage 60 to a distributing passage 62 in wall 40. This wall is provided with a central opening bounded by housings 50 and a manifold ring 63 is fitted in the opening. The ring has two separated annular peripheral grooves 64 and 65, groove 64 communicating with passages 67 leading to the interior of the housings of brake mechanisms C and groove 65 communicating with passages 66 leading to the interior of the housings of brake mechanisms D. Passage 68 leads from the distributing passage 62 to groove 65 and passage 69 leads from passage 62 to groove 64. Valve housing 70 is connected in passage 68 and carries a flow control valve 71 and valve housing 72 is connected in passage 69 and carries a flow control valve 73. These valves can be operated in various ways, one of which is shown in application Serial No. 560,796, filed October 28, 1944, by Forest R. McFarland, Patent #2,441,712.

Valve 71 is connected to be actuated by solenoid 76 and valve 73 is connected to be actuated by solenoid 78. The solenoids may be of conventional design and are suitably secured on the outside of the casing 17. The armatures 79' of the solenoids bear against springs 79 which in turn bear against the valve stems. Springs 790 urge the valves outwardly to shut off oil flow through the valve housings and the solenoids are energized to push the valves inwardly so that oil can flow through the valve housings. Solenoid 76 is energized to move valve 71 so that oil will flow to brake mechanisms C and solenoid 78 is energized so that oil will flow to brake mechanisms D. Oil flow into the brake housings will force the pressure members in a direction to engage the brake plates so that the associated sun gear countershafts will be held stationary.

In the event the brakes in the sets of units A and B should be engaged at the same time, two differing gear ratios would become effective with consequent damage to the gearing so provision is made to prevent such a possibility. Passage 110 in wall 40 connects the bottom portion of valve housing 70 with the groove 64 and a similar passage 111 connects the bottom portion of valve housing 72 with groove 65. By means of these passage connections fluid under pressure will flow to the bottom of the closed valve housing when the other valve housing is open to fluid flow. The fluid pressure and the pressure of spring 790 in the closed valve housing together provide a sufficient force to prevent the solenoid from opening the closed valve and the arrangement is such that when fluid pressure is relieved in the closed valve housing by closing the open valve housing then the solenoid will have sufficient force to overcome the pressure of spring 790 so that the valve will be moved to open position. The flexible actuator springs 79 between the armatures and the valve stems will become compressed when the solenoids are energized and thus the valve is cocked and will be moved into open position by such compressed springs upon the relief of pressure in the bottom portion of the housing. Thus, neither valve 71 nor valve 73 can be opened while the other valve is open and consequently, the brakes in gearing units A can be engaged only when the brakes in gearing units B are disengaged, and vice versa. As a further means for preventing both sets of gearing from operating at the same time, vent passages 112 are formed in wall 40 and are located so that the reduced diameter portion 113 of valves 71 and 73 will connect them with passages 68 and 69 when passage 62 is cut off. When either valve is moved to open passage 62 to passages 68 or 69 the adjacent vent passage will first be shut off. Thus, pressure in the brake housings is relieved except when the associated valve opens the passage 62 to apply the brakes and there can be no fluid drag tending to cause rotation of the two sets of gearing at the same time.

With the mechanism herein described, the supercharger impeller will be driven at one of three speeds so that the necessary fuel will be supplied to an airplane engine to obtain efficient performance at varying elevations.

It will be understood that various forms of the invention other than that described above may be used without departing from the spirit or scope of the invention.

What is claimed is:

1. In a three speed engine supercharger drive, a driving shaft, a driven shaft, the combination with circumferentially aligned selectively operable groups of alternately spaced high and intermediate speed ratio planetary gear units having carriers connected to the driving shaft, ring gears connected to the driven shaft, and sun gear members, the sun gears of the high speed units being of greater diameter than the sun gears of the intermediate speed units, of brake means to selectively lock the sun gears of the high or intermediate speed units to transmit a high or an intermediate speed ratio drive to the driven shaft, and one-way driving means between the carriers and the sun gears of the intermediate speed units to transmit a speed increasing drive of a lower speed ratio than the intermediate speed ratio drive when the brake means for establishing the high and intermediate speed ratio drives are released.

2. In a three speed drive, a driving shaft, a driven shaft, a plurality of circumferentially aligned groups of alternately spaced planetary gear units of different speed ratios having one of their elements connected to the driving shaft and another of their elements connected to the driven shaft, brake means to selectively lock the third element of either group of planetary gear units to establish different speed ratio drives from the driving shaft to the driven shaft, and one-way driving means between said third elements and one of said other elements of the group of planetary gear units having the lower speed ratio to provide a third speed ratio drive to the driven shaft when the brake means for establishing the drives through said selectively operable planetary units are released.

3. In a three speed supercharger drive for an engine having a driving shaft, a driven shaft connected to drive the supercharger, the combination with a group of symmetrically disposed high speed ratio planetary gear units having sun gears, carrier members operably connected to the driving shaft, ring gear members operably connected to the driven shaft, of a group of lower speed ratio planetary gear units circumferentially aligned with the high speed ratio units and alternately spaced with reference thereto, the low speed ratio units having sun gears, carrier members operably connected to the driving shaft, ring gear members operably connected to the driven shaft, brake means to selectively lock the high or lower speed ratio sun gear members against rotation to transmit a high or a lower speed ratio drive from the driving shaft to the driven shaft, and one-way driving means between the carriers and sun gears of the group of lower speed ratio units to transmit a third speed ratio drive from the driving shaft to the driven shaft when the brake means controlling the high and lower speed ratio drives are released.

4. A three speed drive comprising a driving shaft, a gear fixed to the driving shaft, a driven shaft, a gear fixed to the driven shaft, symmetrically disposed groups of alternately spaced high and lower speed ratio planetary gear units having carrier members driven by the driving shaft gear, ring gear members driving the driven shaft gear, and sun gear members, the sun gear members of the high speed ratio units being of greater diameter than the sun gear members of the lower speed ratio units, brake means to selectively lock the high or lower speed ratio sun gear members to transmit high or lower speed ratio drive to the driven shaft, and one-way driving means between the carriers and sun gears of the lower speed ratio units to transmit a lower speed ratio drive when the brake means for establishing the high and lower speed ratio drives through the planetary gear units are released.

JESSE G. VINCENT.

REFERENCES CITED

The following references are of record in the file of this patent:

UNITED STATES PATENTS

| Number | Name | Date |
|---|---|---|
| 1,954,436 | Waseige | Apr. 10, 1934 |
| 2,263,453 | Browne | Nov. 18, 1941 |
| 2,283,284 | Owner | May 19, 1942 |
| 2,354,047 | Owner | July 18, 1944 |
| 2,374,305 | Paton | Apr. 24, 1945 |
| 2,441,712 | McFarland | May 18, 1948 |